Nov. 25, 1941.   C. A. NERACHER ET AL   2,264,002
FLUID COUPLING
Original Filed June 16, 1938   2 Sheets-Sheet 1

INVENTORS
CARL A. NERACHER,
HERBERT F. PATTERSON,
TENO IAVELLI,
ROY T. BUCY,
AUGUSTIN J. SYROVY,
PHILLIP BAKER.
BY
ATTORNEYS

Nov. 25, 1941.  C. A. NERACHER ET AL  2,264,002
FLUID COUPLING
Original Filed June 16, 1938   2 Sheets—Sheet 2
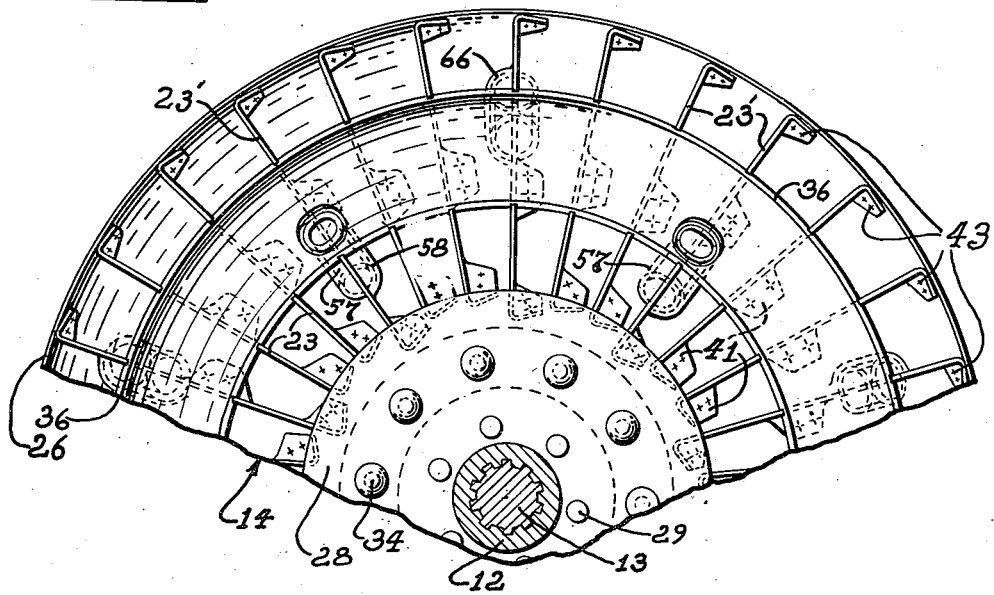
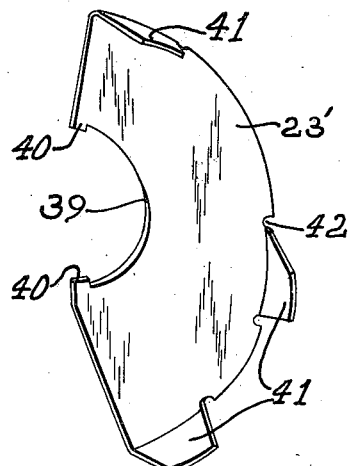
INVENTORS
CARL A. NERACHER,
HERBERT F. PATTERSON,
TENO IAVELLI,
ROY T. BUCY,
AUGUSTIN J. SYROVY,
PHILLIP BAKER.
BY
ATTORNEYS Patented Nov. 25, 1941

2,264,002

UNITED STATES PATENT OFFICE 2,264,002

FLUID COUPLING

Carl A. Neracher, Detroit, Herbert F. Patterson, St. Clair Shores, and Teno Iavelli, Roy T. Bucy, Augustin J. Syrovy, and Phillip Baker, Detroit, Mich., assignors to Chrysler Corporation, Highland Park, Mich., a corporation of Delaware Original application June 16, 1938, Serial No. 214,002. Divided and this application August 24, 1939, Serial No. 291,729

3 Claims. (Cl. 60—54)

This invention relates to a fluid coupling and more particularly to a fluid coupling for drivingly connecting driving and driven members of a motor vehicle, and is a division of patent application, Serial No. 214,002, filed June 16, 1938.

An object of the invention is to provide an improved fluid coupling of relatively light weight and having the requisite strength to successfully resist distortion; and to provide a coupling which may be manufactured at relatively low cost.

In carrying out the above objects the majority of the component parts of the coupling preferably comprise sheet metal stampings which are so constructed and arranged as to facilitate welding operations in providing the assembly, and when so assembled constitute a relatively rigid structure for satisfactorily resisting the action of centrifugal forces set up within the coupling due to the relatively high rotative speeds at which the latter is operated.

A still further object of the invention is to provide an improved construction and arrangement of the circumferentially spaced members providing passages for a fluid medium. Each of the passage forming members or vanes preferably comprises a sheet metal stamping in the interest of lightness of weight and economy of manufacture and is so designed as to facilitate welding operation during assembly.

Another object of the invention is to provide improved means for reinforcing and imparting rigidity to the coupling structure thereby permitting the use of relatively thin and light-weight materials. The reinforcing means is preferably so constructed and arranged that it serves as a backing for adjacent portions of the coupling during assembly and prevents foreign matter gaining access to the interior of the coupling during certain welding operations.

Other objects and advantages of the invention will be more apparent from the following description taken in connection with the accompanying drawings, in which:

Fig. 2 is a fragmentary side elevational view of the coupling runner structure shown in Fig. 1, the view being taken and indicated by the line 2—2 of Fig. 1.

Fig. 3 is a view in perspective of a typical vane-forming member shown in Figs. 1 and 2.

Figure 1:
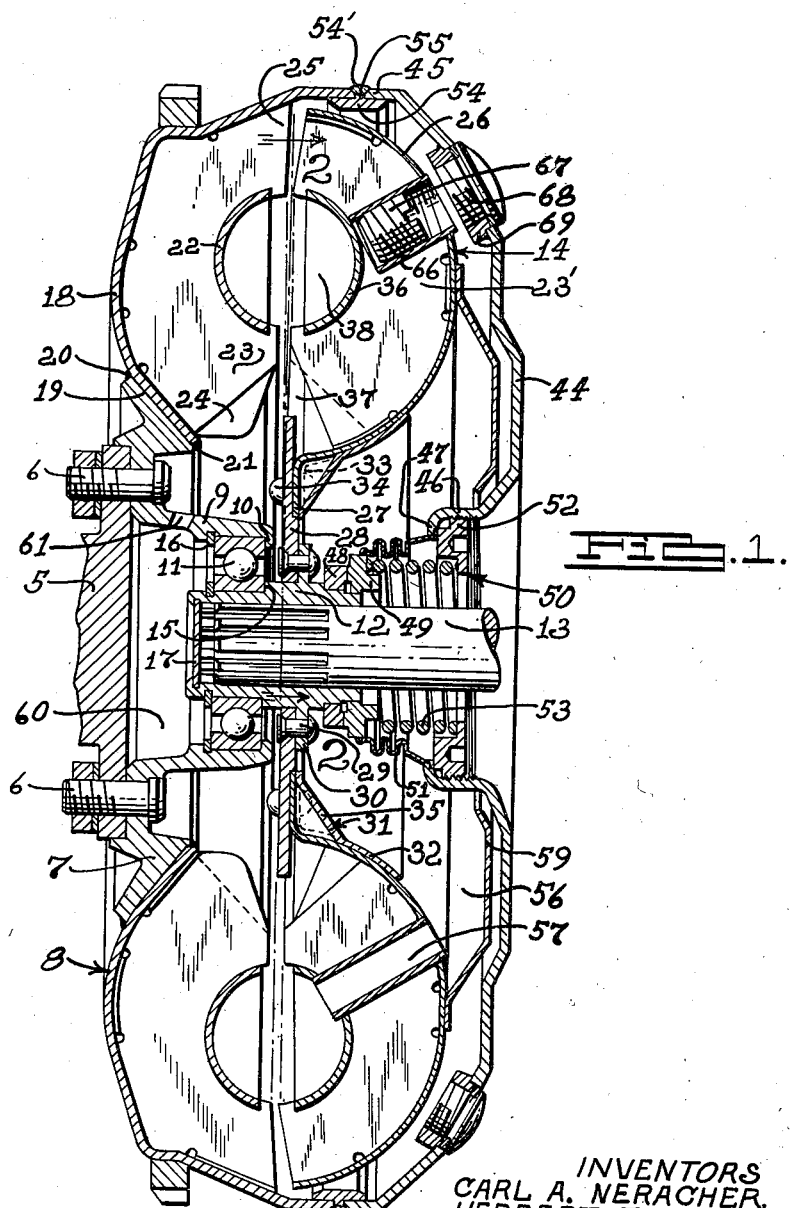
Fig. 1 is a central vertical sectional view of a coupling embodying this invention.

The fluid coupling is of the well known kinetic type comprising juxtapositioned coaxial impeller and runner structures having liquid circulating passages therein for the vortex circulation of the fluid working medium, and includes the radially spaced junctures at which fluid is transferred from one of the structures to the other. When employed in a motor vehicle, for instance, as a driving connection between driving and driven members thereof, the coupling functions as a flywheel structure and is provided with the conventional starter ring gear.

Referring to the drawings the reference character 5 designates a power driving shaft such as the crankshaft of a prime mover (not shown), to which is secured by bolts 6 an annular mounting hub 7 for the impeller structure generally designated at 8. The hub 7 has an annular axially extending sleeve portion 9 terminating in an annular radially inwardly extending flange 10. A bearing structure 11 is positioned radially intermediate the inner face of sleeve 9 and a hub 12 splined on a driven shaft 13, the hub 12 serving to mount the runner structure, generally designated by the numeral 14, of the coupling. The bearing 11 is maintained against axial displacement in one direction by the flange 10 of hub 7 cooperating with a shoulder 15 on the hub 12, and against axial displacement in the opposite direction by a washer 16 having its peripheral edge portion seated in grooves formed in the adjacent faces of sleeve 10 and hub 12. The open end of hub 12 is closed by a disk 17 which prevents escapement of the fluid operating medium for the coupling axially between hub 12 and shaft 13.

The impeller structure 8 includes an annular dished shell element 18 preferably comprising sheet metal, the radially inner free end portion of which conforms generally to the contour of the mounting face 19 of the radially extending portion of hub 7, and is suitably secured to the mounting face by welding, as indicated at 20 and 21.

The impeller structure further includes an inwardly disposed annular dished element 22 preferably comprising sheet metal, the gauge of which is substantially less than that of the element 18. A plurality of circumferentially spaced vanes 23 extend generally radially with respect to the axis of the rotation of the coupling and are disposed between the elements 18 and 22, the spaces between adjacent vanes providing passages for a suitable fluid operating medium, such as oil, entering at 24 and curving outwardly around the inner element 22 for discharge at 25.

The fluid operating medium discharged at 25 passes to the runner structure 14 which includes the annular dished runner element 26 preferably comprising sheet metal. The inner free end portion of the element 26 is deflected to provide the radial flange 27 which abuts an annular centrally apertured disk 28 secured by rivets 29 to an annular radially extending flange 30 of hub 12 splined on the driven shaft 13.

An annular reinforcing member indicated at 31 is provided for the runner element 26, this member having a dish-shaped portion 32 conforming to the contour of the adjacent portion of the element 26 and suitably secured thereto as by welding. The reinforcing member 31 also includes an annular radially inwardly extending flange 33 abutting the flange 27 of the element 26. A plurality of circumferentially spaced rivets 34 engage the flanges 33, 27 and disk 28 for drivingly securing the runner to the driven shaft 13. The reinforcing member 31 is further provided with a deflected portion, in the form of a rib 35 extending diagonally between the portions 32 and 33 for strengthening and rigidifying the runner structure.

The runner structure further includes the inner annular dished element 36 preferably comprising sheet metal, and a plurality of circumferentially spaced vane members, as shown at 23', extending between the elements 26 and 36 to provide the passages corresponding to the passages similarly formed in the impeller structure for receiving the fluid working medium discharged at 25 from the latter structure, the fluid medium circulating around inner runner element 36 for discharge at 37 to the impeller structure. During rotation of the shaft 5, the fluid medium circulates around the annular vortex chamber indicated at 38 and bounded by the inner dished members 22 and 36, the chamber 38 providing a channel having open sides for receiving and discharging fluid to the fluid working chamber provided by the space occupied by the vanes 23 and 23'. The outer end portion of the disc 28 extends into the fluid working chamber and serves as a baffle.

An embodiment of the vane members 23 for the impeller structure is shown in Fig. 3, it being understood that the construction thereof and manner of securing the same in assembled position are generally similar for both structures, it being noted that each vane for the impeller structure has an edge portion conforming to the contour of the part 18.

Each vane member 23 preferably comprises a sheet metal stamping having an outer peripheral edge corresponding generally to the contour of the inner periphery of the runner element 26 against which it seats. The intermediate portion of the inner periphery of the vane 23 is cut away to provide a substantially semi-circular seat 39 for the inner runner element 36, each edge adjacent the cut-away portion being provided with a tab 40 extending inwardly with respect to the latter portion. In assembly the free edges of the inner runner element 36 are sprung to engage the undersurface of a respective tab 40 for retaining the member 36 in position.

The outer peripheral edge of the vane member 23 has a plurality of integrally formed, laterally extending securing tabs 41, one such tab being disposed at each free end portion of the latter peripheral edge and a third tab being located intermediate the free end portions. The vanes 23 are preferably stamped from a flat stock and the tabs 41 subsequently deflected to the position shown in Fig. 3. In the stamping operation the outer edge of the metal is provided with relief portions as indicated at 42 to facilitate bending of the tabs 41 to the position shown. Each tab 41 is preferably spot-welded to the runner element 26 as indicated at 43, the welding being formed by the hydromatic process which does not materially affect the strength characteristics of the metal, it being understood that the vane member 23 is of a relatively thin gauge of metal.

Referring more particularly to Fig. 1, the impeller 8 further includes an annular member 44 surrounding the runner structures. The outer free edge 45 of the member 44 extends generally axially at the extremity thereof and is slightly spaced from the adjacent extremity of the element 18. The inner free edge portion of the member 44 has an axially extending portion 46 provided with a threaded exterior surface and terminates in an annular radially inwardly extending flange 47 spaced from the shaft 13. A ring 48 is press-fitted on a reduced portion of hub 12 for rotation therewith and a second ring 49 is seated in a guideway in the outer peripheral surface of the hub 12 for rotation relative thereto with the impeller structure of the coupling. A sealing unit indicated at 50 is provided for the opening in the member 44 accommodating shaft 13, this unit including a Sylphon bellows portion 51 having one extremity thereof overlapping and suitably secured as by welding to a laterally extending portion of the ring 49. The other extremity of the bellows 51 overlaps the outer face of flange 47 of the member 44 and is held thereagainst by a ring 52 in threaded engagement with the exterior threaded surface of flange 46. A coil spring 53 surrounds shaft 13 and has one end thereof seated against the adjacent face of ring 49 and the other end seated against a radially inwardly extending flange of ring 52, the spring 53 being normally under compression.

The shrouding member 44 is secured to the impeller element 18 by welding, as indicated in Fig. 1. In securing these parts together a ring 54 is positioned interiorly of the coupling in overlapping relationship with the extremities of the parts 18 and 44, and is provided with a radially extending flange 55 disclosed between the adjacent extremities of the latter parts, it being noted that the radial dimension of the flange 55 is less than the thickness of these parts. The space between the parts 18 and 44 unoccupied by the flange 55 is filled with a suitable welding material 54' which, during the welding operation, fuses with the adjacent surfaces of the parts 18 and 44 to provide a suitable union therebetween. The ring 54 serves to exclude welding material from the coupling interior during the welding operation and also acts as a stiffener for the coupling structure, thereby permitting the use of a lighter gauge material without sacrificing strength and rigidity.

In couplings of the type herein illustrated, it is desirable to reduce the fluid content during relatively slow running of the coupling and with this in mind, there is provided an expansion chamber, as indicated at 56, intermediate the runner element 26 and the member 44 of the impeller structure. A plurality of ducts, one of which is indicated at 57, form means for communicating fluid between the chamber 56 and the interior of the coupling. The duct 57 projects through openings in the runner portions 26 and 36 and is secured to an adjacent vane member 23', a portion of the latter being deflected as indicated at 58 in Fig. 2 to provide a semi-circular seat for the duct. The latter is suitably secured to the deflected portion 58 as by spot-welding. An annular baffle member 59 preferably comprising sheet metal is secured as by welding to the outer peripheral surface of the runner element 26 and has its free inner edge terminating adjacent the flanged portion 46 of the impeller member 44. The baffle 59 serves to direct fluid to the ducts 57 for transmission thereby to the interior of the coupling.

A second expansion chamber indicated at 60 is provided by the mounting sleeve 9 in conjunction with the end face of the driving shaft 5. Communication between chamber 60 and the interior of the coupling is provided by a port or ports 61 formed in the sleeve 9. The port 61 communicates with the pocket provided by spacing the mounting portion 19 of the hub 7 axially from the mid-plane of the coupling and radially outwardly beyond the sleeve 9. The disk 28 projects radially outwardly beyond the aforesaid pocket to form a baffle for disrupting fluid circulation between the impeller and runner structures when the coupling is operating at a relatively low speed, this baffling of the fluid facilitating the desired high slip. The effect of the baffle on the fluid circulation becomes less pronounced as the coupling is operated at increased speeds and the velocity of fluid circulation falls with an accompanying decrease in slip.

Suitable balancing means is provided for the coupling, preferably in connection with the runner structure, and includes a plurality of circumferentially spaced conduits 66 extending generally radially with respect to the axis of rotation of the coupling, each conduit having a threaded interior surface for receiving a threaded plug 67. Access to the plugs for installation and adjustment is had through a filler opening in the portion 44, each opening being closed by suitable closure 68 threaded to a thimble or ferrule 69. Each conduit 66 is secured to an adjacent vane 23', the latter having a portion thereof providing a suitable seat, as in the manner set forth in connection with the conduits 57. The conduits 66 are secured to their respective seats preferably by spot-welding.

We do not limit our invention, in the broader aspects thereof, to any particular combination and arrangement of parts such as shown and described for illustrative purposes since various modifications will be apparent from the teachings of our invention and scope thereof as defined in the appended claims.

We claim:

1. In a fluid coupling of the kinetic type including impeller and runner structures cooperating to provide a fluid working chamber, said runner structure including a sheet metal vaned portion and an attaching flange, a reinforcing member for said runner structure having a portion secured to said vane carrying portion and an attaching flange abutting and secured to said first mentioned attaching flange, a hub structure having a radial flange, and a member secured to said attaching flanges and said hub flange drivingly securing said runner structure to said hub structure, said last mentioned member having a portion thereof projecting into said chamber for regulating the circulation of fluid therein.

2. In a fluid coupling of the kinetic type including impeller and runner structures cooperating to form a fluid working chamber including a juncture at which fluid is transferred between said structures, said runner structure including a dished annular sheet metal vane carrying section and an integral inwardly extending attaching flange, a hub structure for rotatably mounting said runner structure including an outwardly extending flange terminating in radially spaced relationship with respect to said attaching flange, and a member bridging the space between and secured to said flanges for drivingly attaching said runner structure to said hub structure, said member having a fluid baffling portion extending into said chamber at said juncture.

3. In a fluid coupling of the kinetic type including vaned impeller and runner structures cooperating to form a fluid working chamber including a juncture at which fluid is transferred between said structures, said runner structure including an annular dish-shaped sheet metal vane carrying section structure carrying an attaching flange extending inwardly therefrom, a hub structure for rotatably mounting said runner structure including an outwardly extending flange, an annular member secured to said hub flange and having a portion thereof disposed in abutting reinforcing relationship with respect to said attaching flange and secured thereto, said annular member having a fluid baffling portion extending into said chamber at said juncture.

CARL A. NERACHER.
HERBERT F. PATTERSON.
TENO IAVELLI.
ROY T. BUCY.
AUGUSTIN J. SYROVY.
PHILLIP BAKER.

CERTIFICATE OF CORRECTION.

Patent No. 2,264,002.  November 25, 1941.

CARL A. NERACHER, ET AL.

It is hereby certified that error appears in the printed specification of the above numbered patent requiring correction as follows: Page 3, second column, lines 4 to 8 inclusive, claim 1, strike out the words and comma "a reinforcing member for said runner structure having a portion secured to said vane carrying portion and an attaching flange abutting and secured to said first mentioned attaching flange," ; and line 12, same claim, strike out "last mentioned"; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.